W. H. COLDWELL.
ROLLER MOUNTING FOR LAWN MOWERS.
APPLICATION FILED SEPT. 21, 1916.

1,279,269.

Patented Sept. 17, 1918.

INVENTOR
William H. Coldwell
BY
Whitaker Prevost ATTORNEYS

UNITED STATES PATENT OFFICE.

WILLIAM H. COLDWELL, OF NEWBURGH, NEW YORK.

ROLLER-MOUNTING FOR LAWN-MOWERS.

1,279,269.  Specification of Letters Patent.  Patented Sept. 17, 1918.

Original application filed March 29, 1916, Serial No. 87,444. Divided and this application filed September 21, 1916. Serial No. 121,368.

*To all whom it may concern:*

Be it known that I, WILLIAM H. COLDWELL, a citizen of the United States, residing at Newburgh, in the county of Orange and State of New York, have invented certain new and useful Improvements in Roller-Mountings for Lawn-Mowers; and I do hereby declare the following to be a full, clear, and exact description of the invention, such as will enable others skilled in the art to which it appertains to make and use the same.

My invention consists in the novel features hereinafter described reference being had to the accompanying drawing which illustrates one embodiment of my invention selected by me for purposes of illustration, and the said invention is fully disclosed in the following description and claims.

This application is a division of my former application for Letters Patent of the United States filed March 29th 1916, Serial #87,444, in which the subject matter hereof was originally claimed and this subject matter is also illustrated in my later application #103,754, filed June 15th 1916.

Referring to the drawings.

My invention is especially applicable to lawn mowers and particularly for the supporting therein of the rear or ground roller with which such mowers are ordinarily provided. In the form of lawn mower herein shown, for example, the mower side frames, indicated at 20, are supported at their forward ends by ground wheels, 23, in any desired manner and at the rear end by the rear ground roller, 56, and carry the rotary cutter, 51, mounted on the cutter shaft, 32, and the stationary knife bar, 52, which carries the stationary knife, $52^a$, coöperating with the rotary cutter.

Figure 1:
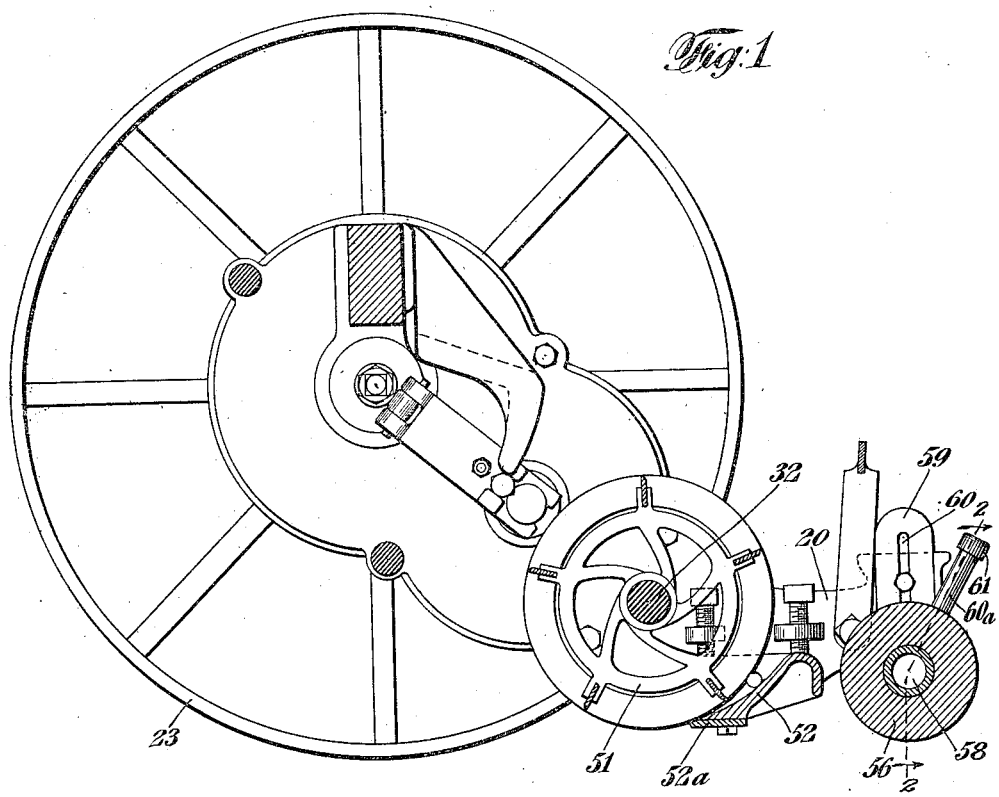
Figure 1 represents a longitudinal sectional view of a lawn mower showing my invention embodied therein.
Figure 2:
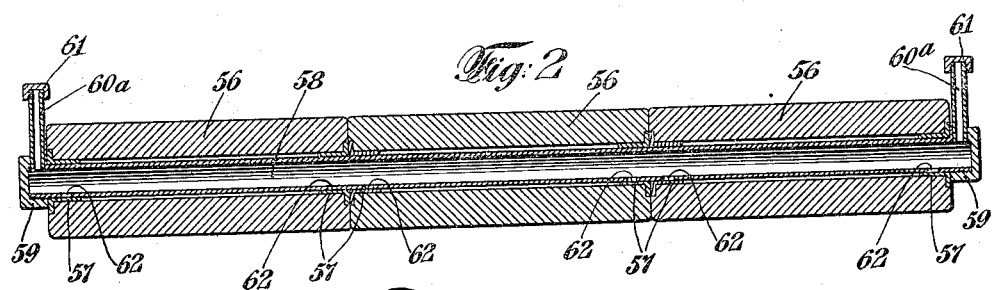
Fig. 2 is a transverse sectional view of the rear roller of the lawn mower on the line 2—2 of Fig. 1 looking in the direction of the arrows.
Figure 3:
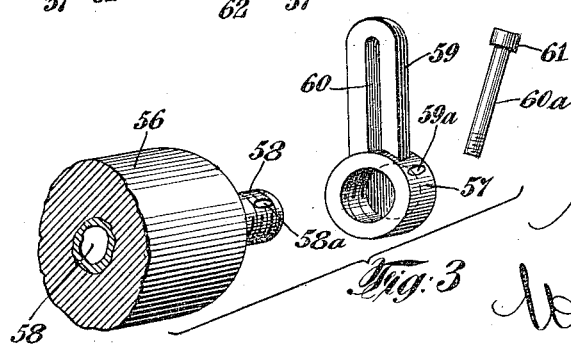
Fig. 3 is a detail perspective view showing one end of the roller and its shaft, one of the hangers and one of the lubricating tubes detached from each other.

The ground roller is preferably formed, as shown in Fig. 2, in three or any number of parts, 56, each of which is provided with bushings, 57, at each end engaging a hollow shaft, 58, the ends of which are screwed into hangers, 59, having cup shaped portions which engage and close the ends of the hollow shaft and are provided with vertically disposed slotted portions, 60, adjustably secured to the side frames. On one or both ends of the hollow shaft, 58, (both ends as shown in Fig. 2) I drill a hole through the hanger, 59, and the hollow shaft, 58, as indicated at $59^a$ and $58^a$ respectively and insert a vertically disposed pipe, $60^a$, provided with a removable cap or closure, 61. This pipe, $60^a$, prevents the rotation of the shaft, 58, in the hangers, and through the said pipe liquid or semi-liquid lubricant can be introduced so as to fill the pipe, 58, throughout its length and said pipe is provided on its lower side adjacent to each of the bushings, 57, with an aperture, 62, so that the lubricant which is preferably in semi-liquid form is supplied to the bearings of the sectional roller, and as a matter of fact, by charging the tubular shaft a sufficient amount of lubricant can be supplied for almost, if not quite, an entire season.

This structure, while exceedingly simple and inexpensive, is extremely efficient and the parts co-act admirably to carry out the purposes of a roller mounting. It will be noted that the hangers not only support the shaft and roller but also serve as caps or closures for the ends of the hollow shaft so as to prevent the lubricant from escaping therefrom. It will also be seen that, as above stated, the lubricating tube which extends through one or both of the hangers and through a corresponding and registering aperture, $58^a$, in the hollow shaft, not only prevents the pipe from rotating within the particular hanger with which the tube or pipe is connected but also, in case only one of these pipes, $60^a$, is used, operates to prevent the hollow shaft from turning into the other hanger as well, that is to say, by preventing the rotation of the pipe or hollow shaft it is prevented from turning in either end.

It will also be seen that the construction of the roller sections themselves is extremely simple and efficient in that it is only necessary to bore out the wooden roller and drive the bushings in the opposite ends thereof and as the holes in the shaft for distributing the lubricant are so located as to be within the bushings, as shown, all the parts which require lubrication are perfectly lubricated and a reservoir of lubrication is provided within the shaft.

What I claim and desire to secure by Letters Patent is:

1. In a roller mounting for lawn mowers, the combination with a rigid frame having opposed portions, a pair of separate hangers each provided with an interiorly threaded member and means for adjustably securing said hangers respectively to the opposed frame portions, of a hollow shaft having threaded end portions engaging said threaded members of the hangers, at least one of said hangers being provided with a threaded aperture extending through its lateral wall and having its axis perpendicular to that of the shaft, and said shaft having an aperture in at least one of its threaded end portions to register with the aperture in the hanger, a lubricant tube engaging the said registering apertures and disposed perpendicularly to the axis of said shaft, a closure for said tube, said shaft being provided with lubricating apertures between its ends, and a roller mounted on said shaft.

2. In a roller mounting for lawn mowers, the combination with a rigid frame having opposed portions, a pair of separate hangers each provided with an interiorly threaded member and means for adjustably securing said hangers respectively to the opposed frame portions, of a hollow shaft having threaded end portions engaging said threaded members of the hangers, at least one of said hangers being provided with a threaded aperture extending through its lateral wall and having its axis perpendicular to that of the shaft, and said shaft having an aperture in at least one of its threaded end portions to register with the aperture in the hanger, a lubricant tube engaging the said registering apertures and disposed perpendicularly to the axis of said shaft, a closure for said tube, a roller formed of sections placed end to end, each section being provided at each end with a bushing, and said shaft being provided along its lower portion with lubricating apertures in line transversely of the shaft with the said bushings.

In testimony whereof I affix my signature.

WILLIAM H. COLDWELL.

Copies of this patent may be obtained for five cents each, by addressing the "Commissioner of Patents, Washington, D. C."